United States Patent [19]

Tsurumaki

[11] Patent Number: 5,103,152

[45] Date of Patent: Apr. 7, 1992

[54] DRIVE CONTROL CIRCUIT FOR SENSORLESS TYPE THREE-PHASE HALF-WAVE MOTOR

[75] Inventor: Hayako Tsurumaki, Tokyo, Japan

[73] Assignee: Kabushiki Kaisha Toshiba, Kanagawa, Japan

[21] Appl. No.: 644,495

[22] Filed: Jan. 23, 1991

[30] Foreign Application Priority Data

Jan. 26, 1990 [JP] Japan ................................. 2-17301

[51] Int. Cl.⁵ ............................................ H02P 3/18
[52] U.S. Cl. ................................. 318/764; 318/756; 318/739
[58] Field of Search ............... 318/658, 138, 254, 439, 318/756, 798, 805, 739, 763, 764

[56] References Cited

U.S. PATENT DOCUMENTS

| | | | |
|---|---|---|---|
| 3,262,041 | 7/1966 | Wickenhagen | 318/763 |
| 3,649,894 | 3/1972 | Yoneya | 318/763 |
| 4,169,990 | 10/1979 | Ierdman | 318/138 |
| 4,600,872 | 7/1986 | Shepard, Jr. | 318/658 |
| 4,862,052 | 8/1989 | Unsworth et al. | 318/763 |
| 4,922,169 | 5/1990 | Freeman | 318/254 |

Primary Examiner—William M. Shoop, Jr.
Assistant Examiner—John W. Cabeca
Attorney, Agent, or Firm—Banner, Birch, McKie & Beckett

[57] ABSTRACT

A level detector outputs signals every time voltages induced by the U-phase, V-phase and W-phase motor coils exceed a predetermined level. When the signals are output in a predetermined order from the level detector, U-phase, V-phase and W-phase commutation circuits supply control signals to U-phase, V-phase and W-phase drive current output circuits, respectively. When the signal outputting order is reversed to the predetermined order, the commutation circuits output no control signals. Upon reception of the control signals from the U-phase, V-phase and W-phase commutation circuits, the U-phase, V-phase and W-phase drive current output circuits supply the currents to the respective motor coils. When at three-phase half-wave motor is rotating in the forward direction, therefore, the currents will be sequentially supplied to the motor coils from the associated drive current output circuits for the individual phases. When the motor rotates in the reverse direction, no currents will be supplied to the motor coils, thus stopping the motor.

13 Claims, 4 Drawing Sheets

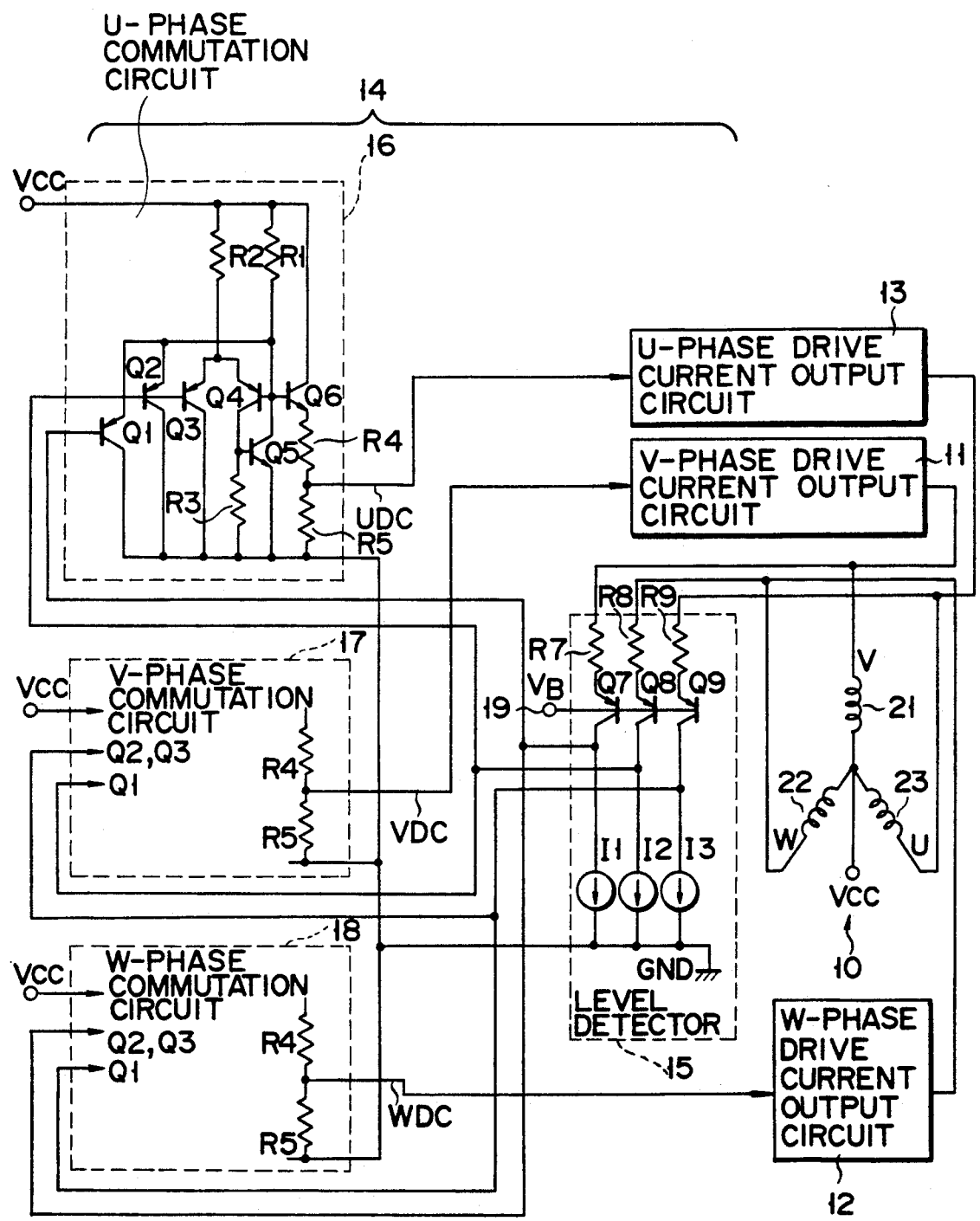
F I G. 1

DRIVE CONTROL CIRCUIT FOR SENSORLESS TYPE THREE-PHASE HALF-WAVE MOTOR

BACKGROUND OF THE INVENTION

1. Field of the Invention

The present invention relates to a motor drive circuit to drive a fuel pump of an automobile, for example. More particularly, this invention pertains to a drive circuit for a three-phase half-wave motor of a sensorless type having no sensor for detecting the rotational direction.

2. Description of the Related Art

Conventionally, driving a sensorless type three-phase half-wave motor is using a commutation circuit, which drives and controls the motor using voltages induced by motor coils.

FIG. 4 illustrates a drive circuit for a three-phase half-wave motor rotatable in two directions. This drive circuit includes a three-phase half-wave motor 30, a drive current output circuit 31, and a commutation circuit 32. In the motor 30, U-phase, V-phase, and W-phase motor coils 33, 34, and 35 each have one end connected to power supply $V_{CC}$, and an other end connected to U-phase, V-phase, and W-phase output terminals of the drive current output circuit 31. In the commutation circuit 32, PNP transistors $Q_4$, $Q_5$, and $Q_6$ have their bases and collectors connected together, and their emitters respectively connected to U-phase, V-phase, and W-phase output terminals of the drive current output circuit 31. Resistors $R_1$ and $R_2$ are connected in series between the commonly connected collectors of the PNP transistors $Q_4$ to $Q_6$ and the power supply $V_{CC}$.

Resistors $R_3$ and $R_4$ each have one end connected to the V-phase and W-phase output terminals, and an other end connected to the emitter of a PNP transistor $Q_1$. Resistors $R_5$ and $R_6$ each have one end respectively connected to the W-phase and U-phase output terminals and another end connected to the emitter of a PNP transistor $Q_2$. Resistors $R_7$ and $R_8$ each have one end connected to the U-phase and V-phase output terminals, and another end connected to the emitter of a PNP transistor $Q_3$. The transistors $Q_1$ to $Q_3$ have their bases connected to a series node A of the resistors $R_1$ and $R_2$, and their collectors connected to the U-phase, V-phase, and W-phase input terminals of the drive current output circuit 31, respectively.

The operation of the above motor drive circuit will now be explained referring to waveforms in FIG. 5. Given that the voltages induced by the motor coils rise in the order of U-phase to V-phase, then to W-phase as shown in FIG. 5A, when half the sum of the voltages induced by the V-phase and W-phase motor coils (the emitter voltage of the PNP transistor $Q_1$) exceeds the voltage $V_{a+VF}$ ($V_a$=the voltage at the node A, $V_F$=the emitter-base voltage of the PNP transistors $Q_1$ to $Q_3$), the transistor $Q_1$ is turned on and the U-phase motor coil 33 is excited. The voltage at the node A is the voltage difference between the collector voltage of the PNP transistors $Q_4$ to $Q_6$ and the voltage of the power supply $V_{CC}$ which is divided by the resistors $R_1$ and $R_2$. The collector voltage of the PNP transistors $Q_4$ to $Q_6$ is the combined voltage of the three-phase induced voltages minus the emitter-base voltage of the PNP transistors $Q_4$ to $Q_6$. Assuming that the resistance of the resistor $R_2$ is "0" and that the emitter-base voltage $V_F$ of the PNP transistors $Q_1$ to $Q_3$ is considered negligible, the U-phase, V-phase, and W-phase motor coils are driven at timings differing by 120° from one another as shown in FIGS. 5B, 5C, and 5D, thereby rotating the motor.

With the conventional three-phase half-wave motor drive circuit, however, the motor coils are excited independent of the direction, forward or reverse, in which the motor rotates. For example, the sum of the voltages induced by the V-phase and W-phase motor coils 34 and 35 is used to drive the U-phase motor coil 33. Whichever motor coil 34 or 35 rises first, the emitter voltage of the PNP transistor $Q_1$ will have the same waveform. If the waveform shown in FIG. 5A corresponds to a motor rotating in the forward direction, when the motor coil voltages rise in the order of W-phase to V-phase, then to U-phase, the motor will rotate in the reverse direction.

At the beginning of activation, the three-phase half-wave motor of this type is rotatable in either direction (forward or reverse direction), in accordance with the relationship between the positions of multiple permanent magnets, provided on a rotor (not shown), and the positions of magnetic fields produced by the motor coils. The above-described conventional circuit to drive such a three-phase half-wave motor excites the motor coils independent of the direction the motor turns, forward or reverse, at the beginning of activation. In other words, the motor sometimes turns in the forward direction, and sometimes in the reverse direction, and it is not possible to restrict the rotational direction of the motor to either the forward or reverse direction.

SUMMARY OF THE INVENTION

It is therefore an object of the present invention to provide a drive circuit for a three-phase half-wave motor, which is capable of restricting the rotation of the motor to one direction.

To achieve this object, a circuit for driving a three-phase half-wave motor comprises:

current supply means for supplying a drive current to each of three motor coils of a three-phase half-wave motor;

detecting circuit for detecting voltages induced by the three motor coils and for outputting output signals in association with the voltages of the three motor coils; and controller means for controlling the current supply means so as to sequentially supply the drive current to the three motor coils when the order of the output signals from the detecting circuit corresponds to forward rotation of the motor, and for controlling the current supply means so as not to supply the drive current to the three motor coils when the order of the output signals corresponds to reverse rotation of the motor.

With the above structure, the detecting circuit outputs the output signal in accordance with the voltages induced by the motor coils. When the outputting order of the output signals from the detecting circuit corresponds to the forward rotation of the motor, the controller controls the current supply circuit so as to sequentially supply the current to the three motor coils. When this signal outputting order corresponds to the reverse rotation of the motor, however, the controller controls the current supply circuit not to supply the current to these motor coils. Therefore, the rotation of the motor can be restricted to one direction.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram illustrating a three-phase half-wave motor drive circuit of the first embodiment of the present invention;

DETAILED DESCRIPTION OF THE PREFERRED EMBODIMENTS

Figure 2:
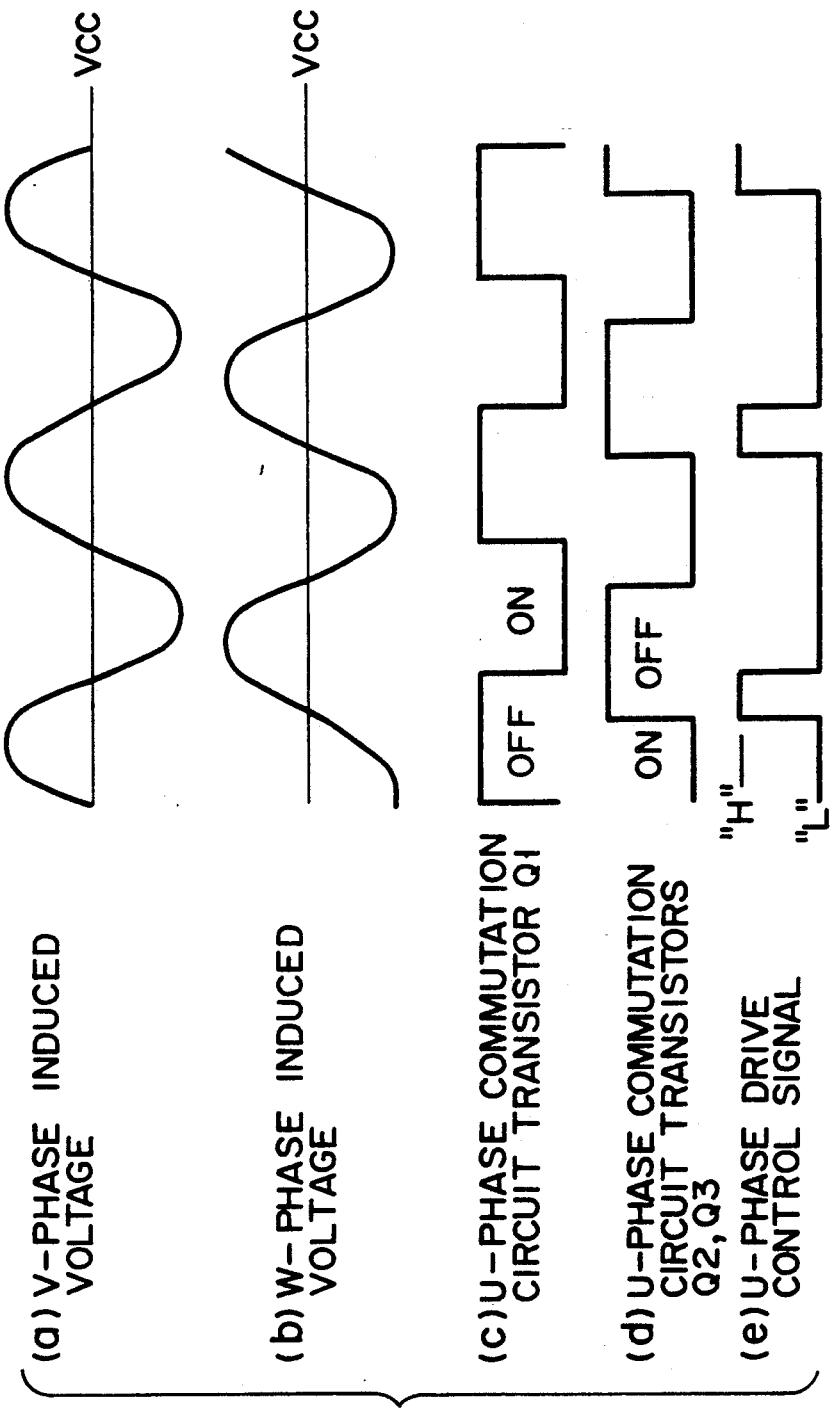
FIG. 2 is a waveform diagram illustrating the operation of the circuit in FIG. 1.

One preferred embodiment of the present invention will now be described referring to the accompanying drawings.

FIG. 1 is a three-phase half-wave motor drive circuit, which includes a three-phase half-wave motor 10, a V-phase drive current output circuit 11, a W-phase drive current output circuit 12, a U-phase drive current output circuit 13, and a rotational direction detecting circuit 14. The V-phase, W-phase, and U-phase drive current output circuits 11 to 13 and the detecting circuit 14 are integrated except for output level power transistors of the output circuits (not shown).

In the three-phase half-wave motor 10, the V-phase, W-phase, and U-phase motor coils 21, 22, and 23 each have one end connected to a 5V power supply $V_{CC}$, for example, and the an other end connected to output terminals of the drive current output circuits 11 to 13 respectively. These output circuits 11 to 13, like those of the prior art, are designed to supply the drive current to three motor coils 21 to 23.

The rotational direction detecting circuit 14 detects the rotational direction of the motor by checking if the voltages induced by the motor coils 21 to 23 are output in a predetermined order. When the motor is found to be rotating in the forward direction, the detecting circuit 14 controls the drive current output circuits 11 to 13 to sequentially supply the drive current to the three motor coils 21 to 23. When the motor rotates in the reverse direction, however, the detecting circuit 14 controls the output circuits 11 to 13 so that no drive current is supplied to the motor coils 21 to 23.

The rotational direction detecting circuit 14 includes a level detector 15 which detects if the voltages of the motor coils 21 to 23 are higher than a predetermined level, and U-phase, V-phase, and W-phase commutation circuits 16, 17, and 18 which receive output signals from the level detector 15. In response to two of the three detection outputs of the level detector 15, the U-phase, V-phase, and W-phase commutation circuits 16, 17, and 18 output signals to drive the drive current output circuits 11 to 13 only when the motor is rotating in a predetermined direction.

The level detector 15 has PNP transistors $Q_7$ for V-phase level detection, $Q_8$ for W-phase level detection, and $Q_9$ for U-phase level detection. The bases of these transistors $Q_7$ to $Q_9$ are connected to a reference level input terminal 19. Resistors $R_7$ to $R_9$ are connected respectively between the emitters of the transistors $Q_7$ to $Q_9$ and output terminals of the output 15 circuits 11 to 13. Current sources $I_1$ to $I_3$ are arranged respectively between the collectors of the transistors $Q_7$ to $Q_9$ and a ground potential GND. A reference level voltage $V_B$ is supplied to the reference level input terminal 19.

Since the U-phase, V-phase, and W-phase commutation circuits 16, 17 and 18 have the same structure, only the structure of the U-phase commutation circuit 16 will be explained. The emitter of a PNP transistor $Q_1$ is connected to the emitter of a PNP transistor $Q_2$, while the collectors of the transistors $Q_1$ and $Q_2$ are connected to the ground potential GND. A resistor $R_1$ is connected between the emitters of the PNP transistors $Q_1$ and $Q_2$ and the power supply $V_{CC}$. A PNP transistor $Q_3$ has its base connected to the base of the transistor $Q_2$, and its collector grounded. The emitter of the transistor $Q_3$ is connected to the emitter of a PNP transistor $Q_4$. The transistor $Q_4$ has the base connected to the emitters of the transistors $Q_1$ and $Q_2$. A resistor $R_2$ is connected between the emitters of the PNP transistors $Q_3$ and $Q_4$ and the power supply $V_{CC}$. A resistor $R_3$ is connected between the collector of the transistor $Q_4$ and the ground potential GND. An NPN transistor $Q_5$ has its base connected to the collector of the transistor $Q_4$, its emitter connected to the potential GND, and its collector connected to the base of the transistor $Q_4$. The base of an NPN transistor $Q_6$ is also connected to the base of the transistor $Q_4$. The transistor $Q_6$ has its collector connected to the power supply $V_{CC}$, while between its emitter and the ground potential GND are with resistors $R_4$ and $R_5$ connected in series.

The collector of the transistor $Q_7$ for V-phase level detection is connected to the transistor $Q_1$ of the U-phase commutation circuit 16. The collector of the transistor $Q_8$ for W-phase level detection is connected to the bases of the transistors $Q_2$ and $Q_3$. The node of the resistors $R_4$ and $R_5$ is connected to the U-phase drive current output circuit 13.

In the V-phase commutation circuit 17, connected to the base of the transistor $Q_1$ is the collector of the transistor $Q_8$ for W-phase level detection. The collector of the transistor $Q_9$ for U-phase level detector is connected to the bases of the transistors $Q_2$ and $Q_3$. The series node of the resistors $R_4$ and $R_5$ is connected to the V-phase drive current output circuit 11.

The transistor $Q_1$ of the W-phase commutation circuit 18 has its base connected to the collector of the transistor $Q_9$. Connected to the transistors $Q_2$ and $Q_3$ is the collector of the transistor $Q_7$, and the series node of the resistors $R_4$ and $R_5$ is connected to the W-phase drive current output circuit 12.

The operation of the above motor drive circuit will now be described referring to FIG. 2. Among the U-phase, V-phase, and W-phase commutation circuits 16, 17, and 18, the operation of the U-phase commutation circuit 16 will be explained.

As illustrated in FIGS. 2A and 2B, the U-phase commutation circuit 16 outputs, for example, a high-level U-phase drive control signal UDC when the voltage induced by the V-phase motor coil 21 exceeds a predetermined level before the voltage induced by the W-phase motor coil 22. On the other hand, when the voltage induced by the W-phase motor coil 22 exceeds the predetermined level before the voltage induced by the V-phase motor coil 21, the U-phase commutation circuit 16 outputs a low-level U-phase drive control signal UDC.

When the voltage of the V-phase motor coil 21 exceeds $V_B+V_F$ ($V_B$: reference level, $V_F$: emitter-base voltage of the PNP transistors $Q_7$ to $Q_9$), the transistor $Q_7$ is turned on, and the transistor $Q_1$ is turned off in accordance with the collector voltage of $Q_7$, as shown in FIG. 2C. In this condition, when the voltage of the W-phase motor coil 22 exceeds $V_B+V_F$, the transistor $Q_8$ is turned on, and the transistors $Q_2$ and $Q_3$ are turned off in accordance with the collector voltage of $Q_8$, as shown in FIG. 2D. As a result, the base potential of the transistor $Q_6$ rises, turning on the transistor $Q_6$, the potential at the series node of the resistors $R_4$ and $R_5$ becomes a high level. As shown in FIG. 2E, therefore, the U-phase drive current output circuit 13 supplies the current to the U-phase motor coil 23 in accordance with the high-level U-phase drive control signal UDC from the U-phase commutation circuit 16.

When the voltage induced by the W-phase motor coil 22 exceeds $V_B+V_F$ before the V-phase induced voltage does, on the other hand, the transistor $Q_8$ is turned on before the transistor $Q_7$. When the transistors $Q_2$ and $Q_3$ are turned off in accordance with the collector voltage of $Q_8$, the base potential of the transistor $Q_6$ drops, turning on the transistors $Q_4$ and $Q_5$ and turning off the transistor $Q_6$. Accordingly, the potential at the series node of the resistors $R_4$ and $R_5$ becomes a low level. In this condition, when the V-phase induced voltage exceeds $V_B+V_F$, the transistor $Q_7$ is turned on, so that even if the transistor $Q_1$ is turned off in accordance with the collector voltage, the transistor $Q_6$ is kept off and the potential at the series node of the resistors $R_4$ and $R_5$ remains at a low level. Consequently, the low-level U-phase drive control signal UDC from the U-phase commutation circuit 16 renders the U-phase drive current output circuit 13 non-operative, inhibiting the current supply to the U-phase motor coil 23.

With regard to the V-phase commutation circuit 17, when the voltage induced by the W-phase motor coil 22 becomes greater than the predetermined level ($V_B+V_F$) first and the voltage induced by the U-phase motor coil 23 does so next, the W-phase drive control signal VDC becomes a high level. When the induced voltages exceed the predetermined level in the reverse order, the V-phase drive control signal VDC becomes a low level.

With regard to the W-phase commutation circuit 18, when the U-phase induced voltage becomes greater than the predetermined level ($V_B+V_F$) first and the V-phase induced voltage does so next, the W-phase drive control signal WDC becomes a high level. When the induced voltages exceed the predetermined level in the reverse order, the W-phase drive control signal WDC becomes a low level.

When the motor rotates in the forward direction upon activation and the voltages induced by the motor coils rise in the order of V-phase, W-phase and U-phase, the U-phase drive control signal UDC is at a high level during a period in which the V-phase induced voltage and the W-phase induced voltage exceed the predetermined level in the named order, i.e., during a period of approximately 60°. The drive control signal VDC is at a high level during a period in which the W-phase induced voltage and the U-phase induced voltage exceed the predetermined level in the named order, i.e., during a period of approximately 60°. Further, the W-phase drive control signal WDC is at a high level during a period in which the U-phase induced voltage and the V-phase induced voltage exceed the predetermined level in the named order, i.e., during a period of approximately 60°. Therefore, the drive currents are sequentially supplied to the motor coils 21 to 23 from the respective drive current output circuits 11 to 13, thus rotating the motor in the forward direction.

When the motor rotates in the reverse direction upon activation, the U-phase control signal UDC, V-phase drive control signal VDC and W-phase drive control signal WDC become a low level, inhibiting the supply of the drive currents from the drive current output circuits 11–13 to the motor coils 21–23, so that the motor will be stopped.

Figure 3:
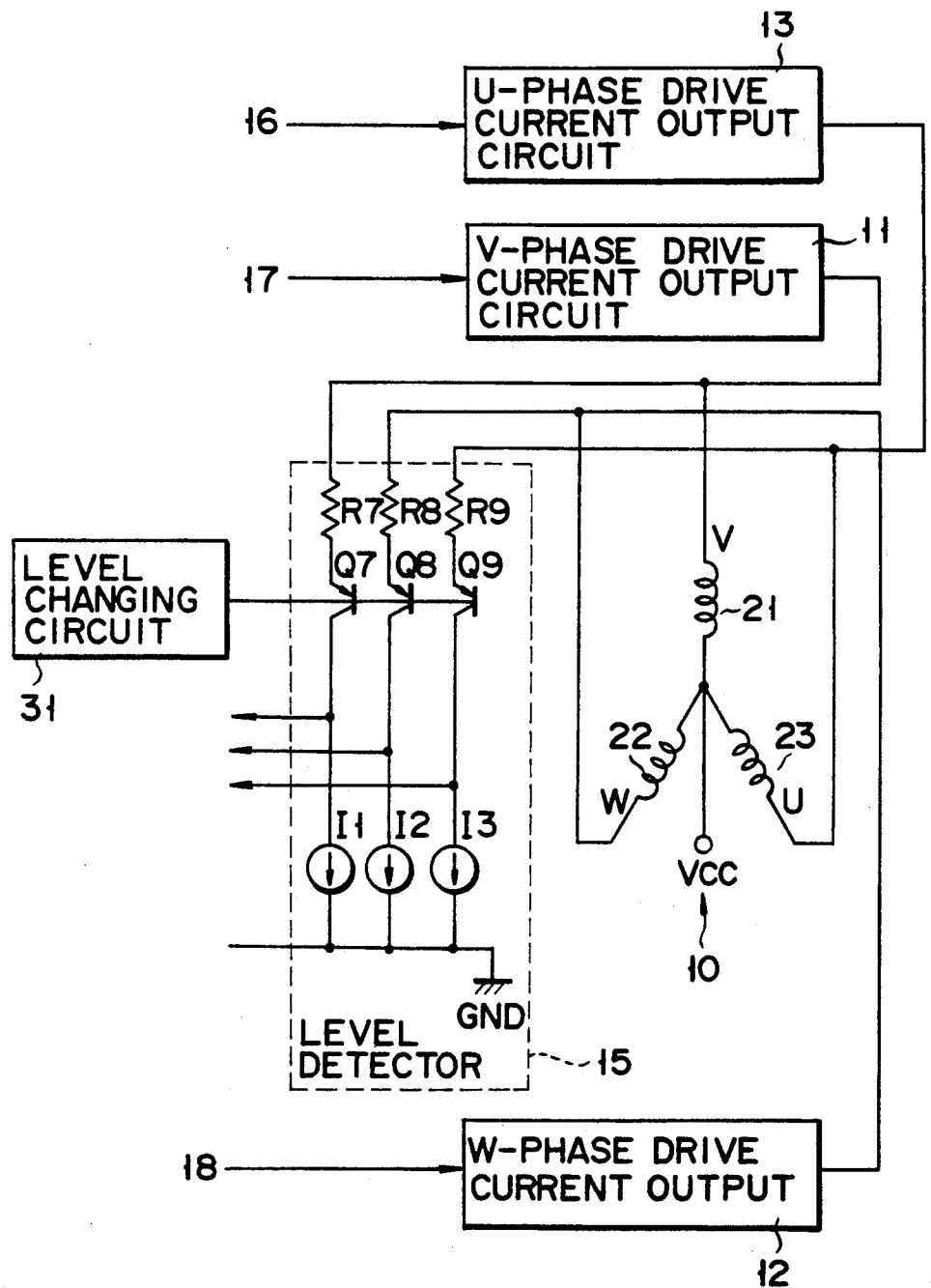
FIG. 3 is a circuit diagram illustrating the essential parts of the second embodiment of the present invention.

According to the above embodiment, a constant power voltage $V_{CC}$ is supplied as the reference level $V_B$ to the reference level input terminal 19, and the detection timing in the level detector 15 is defined according to the power supply voltage $V_{CC}$, and the drive periods of the motor coils 21–23 are determined in accordance with the detection timing. In other words, according to the embodiment, the currents are supplied to the individual motor coils for a period of 60°. If a level changing circuit 31 is connected to the bases of the transistors $Q_7$ to $Q_9$ and the reference level voltage $V_B$ is variably controlled by this circuit 31, as shown in FIG. 3, the detection timing of the level detector 15 can be altered, thus permitting the drive periods for the motor coils 21–23 to be changed. This can therefore ensure variable control of the torque of the motor 10.

Figure 4:
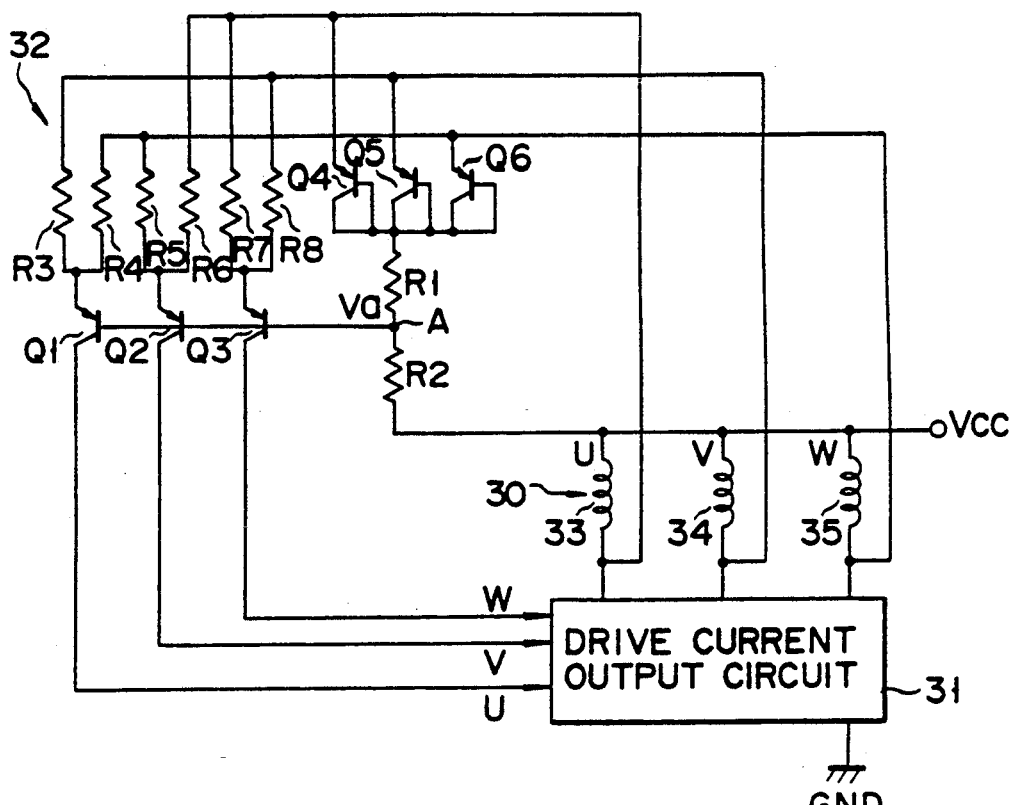
FIG. 4 is a diagram illustrating a prior art drive circuit for a three-phase half-wave motor rotatable in two directions.
Figure 5:
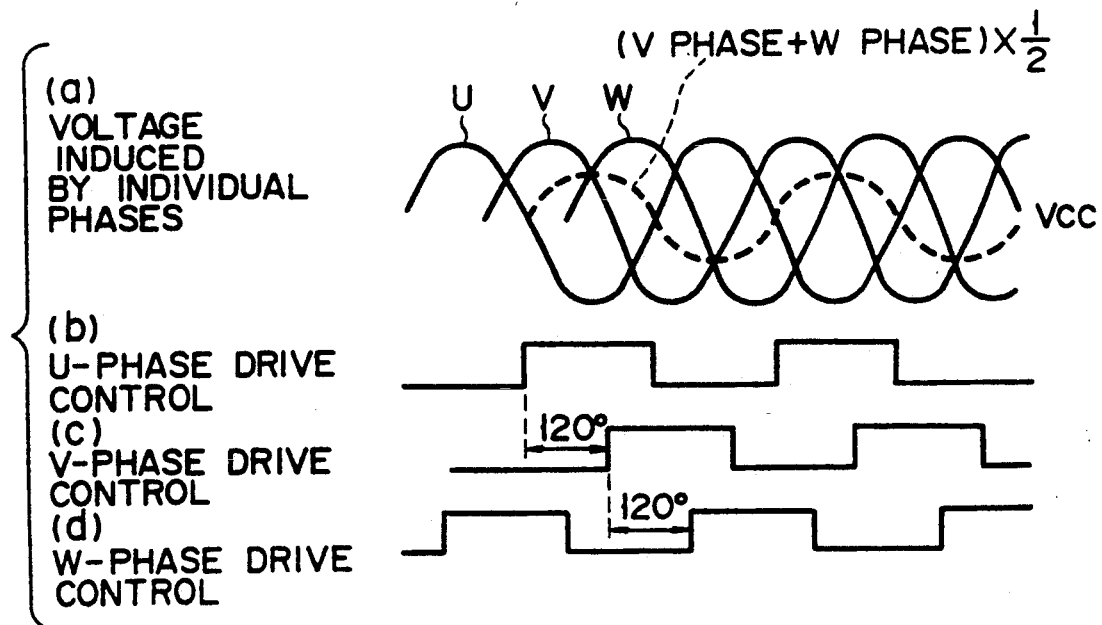
FIG. 5 is a waveform diagram illustrating the operation of the prior art circuit in FIG. 4.

Alternatively, it is possible to generate large torque by determining the rotational direction of the motor using the drive circuit for a three-phase half-wave motor according to the above embodiment at the time of activating the motor 10, using the drive circuit for the three-phase half-wave motor rotatable in two directions to supply the drive currents to the motor coils at timings differing by 120° from one another as shown in FIG. 4 after the activation of the motor.

The present invention should not be restricted to the above-described embodiments, but may be modified in various manners within the scope and spirit of the invention.

What is claimed is:

1. A circuit for driving a three-phase half-wave motor comprising:
    current supply means for supplying a drive current to each of three motor coils of the three-phase half-wave motor;
    detecting circuit for detecting voltages induced by said three motor coils and for sequentially outputting output signals in response to said detected voltages; and
    control means coupled to said detecting circuit for controlling said current supply means to supply said drive current to said three motor coils when a sequence of said output signals corresponds to a first direction of rotation of said motor, and for controlling said current supply means to cut off said drive current to said three motor coils when a sequence of said output signals corresponds to a second direction of rotation of said motor.

2. The circuit according to claim 1, wherein said detecting circuit comprises:

a reference voltage generator for generating a reference voltage; and a plurality of transistors which respectively receive voltages induced by said three motor coils of said three-phase half-wave motor and are conductive when said induced voltages are greater than said reference voltage.

3. The circuit according to claim 2, wherein said reference voltage generator is a power supply for outputting a reference voltage having a constant level.

4. The circuit according to claim 2, wherein said reference voltage generator is a level changing circuit capable of changing a reference voltage level.

5. The circuit according to claim 1, wherein said control means comprises:
a first transistor which is turned off when a first output signal from said detecting circuit is at a high level;
a second transistor which is turned off when a second output signal from said detecting circuit is at a high level; and
a third transistor which is turned on when said second transistor is turned off, said third transistor outputting a high level drive control signal to said current supply means such that said current supply means is enabled to supply said drive current to one of said motor coils.

6. A circuit for driving a three-phase half-wave motor comprising:
current supply circuits for applying a drive current to each of three motor coils of the three-phase half-wave motor;
detecting circuit for detecting voltages induced by said three motor coils and for outputting first, second, and third output signals in response to said detected voltages;
a first group of transistors, at least one of which is turned off when the first output signal from said detecting circuit is at a high level;
a second group of transistors, at least one of which is turned off when the second output signal from said detecting circuit is at a high level; and
a third group of transistors, at least one of which is turned on when one of said second transistors is turned off at a time when one of said first transistors is off, wherein said transistor which is turned on outputs a high level drive control signal to one of said current supply circuits such that said current supply circuit is enabled to supply said drive current to one of said motor coils.

7. The circuit according to claim 6, wherein said detecting circuit comprises:
a reference voltage generator for generating a reference voltage; and
a plurality of transistors which respectively receive voltages induced by said three motor coils of said three-phase half-wave motor and are conductive when said induced voltages are greater than said reference voltage.

8. The circuit according to claim 7, wherein said reference voltage generator is a power supply for outputting a reference voltage having a constant level.

9. The circuit according to claim 7, wherein said reference voltage generator is a level changing circuit capable of changing a reference voltage level.

10. A circuit for driving a three-phase half-wave motor comprising:
(a) current supply circuits for supplying a drive current to each of three motor coils of the three-phase half-wave motor;
(b) a reference voltage generator for generating a reference voltage;
(c) first, second, and third transistors which respectively receive voltages induced by said three motor coils and said reference voltage from said reference voltage generator, and output first, second, and third output signals in response to said received voltages when said received voltages are greater than said reference voltage;
(d) first, second, and third commutation circuits each comprising:
a fourth transistor which is turned off when one of the output signals is at a high level;
a fifth transistor which is turned off when one of the output signals is at a high level; and
a sixth transistor which is turned on when said fifth transistor is turned off at a time when the fourth transistor is off, said sixth transistor outputting a high level drive control signal to one of said current supply circuits such that said current supply circuit is enabled to supply said drive current to one of said motor coils.

11. The circuit according to claim 1, wherein said first direction of rotation corresponds to forward rotation and said second direction of rotation corresponds to reverse rotation.

12. A three-phase half-wave motor comprising:
a plurality of motor coils;
current supply means for supplying a drive current to each of said plurality of motor coils;
detecting circuit for detecting voltages induced by said plurality of motor coils and for outputting output signals in response to said detected voltages; and
control means coupled to said detecting circuit for controlling said current supply means to supply said drive current to said plurality of motor coils when a sequence of said output signals corresponds to a first direction of rotation of said motor, and for controlling said current supply means to cut off said drive current to said plurality of motor coils when a sequence of said output signals corresponds to a second direction of rotation of said motor.

13. A method of driving a three-phase half-wave motor having a plurality of motor coils, the method comprising the steps of:
supplying a drive current to each of said plurality of motor coils;
detecting voltage induced by said plurality of motor coils;
generating output signals in response to said detected voltages;
supplying said drive current to said plurality of motor coils when a sequence of said output signals corresponds to a first direction of rotation of said motor; and
cutting off said drive current supplied to said plurality of motor coils when a sequence of said output signals corresponds to a second direction of rotation of said motor.

* * * * *